United States Patent [19]
Hanson

[11] 3,889,832
[45] June 17, 1975

[54] VEHICLE FOR TRANSPORTING HAYSTACKS AND THE LIKE

[76] Inventor: Howard G. Hanson, Box 408, 1203 Prairie Heights, Larned, Kans. 67550

[22] Filed: Dec. 6, 1973
[21] Appl. No.: 422,542

[52] U.S. Cl. ............................... 214/514; 214/84
[51] Int. Cl. ............................................ B60p 1/04
[58] Field of Search ............ 214/38 BA, 514, 83.22, 214/390, 767, 82, 350, 353, 512, 510

[56] References Cited
UNITED STATES PATENTS

| | | | |
|---|---|---|---|
| 2,372,870 | 4/1945 | Willrodt | 214/514 |
| 2,654,494 | 10/1953 | Stratman | 214/767 |
| 3,000,522 | 9/1961 | Grange | 214/653 |
| 3,209,932 | 10/1965 | Schiltz | 214/508 |

Primary Examiner—Robert J. Spar
Assistant Examiner—Gary Auton
Attorney, Agent, or Firm—Williamson, Bain & Moore

[57] ABSTRACT

A vehicle for transporting haystacks and the like, includes a horizontal frame supported by ground engaging wheels and adapted to be towed by a tractor or similar prime mover. The frame includes a plurality of horizontal tines and is vertically shiftable between a lowered position and an elevated transport position. The tines may be pushed rearwardly beneath the formed haystack when the frame is in the lowered position to permit ready loading of the haystack on the frame. Thereafter, the frame may be elevated for transport or for unloading upon a truck or wagon body. A vertical pusher member is mounted on the frame and is shiftable rearwardly from a forward position to progressively push and unload the stack from the frame.

6 Claims, 9 Drawing Figures

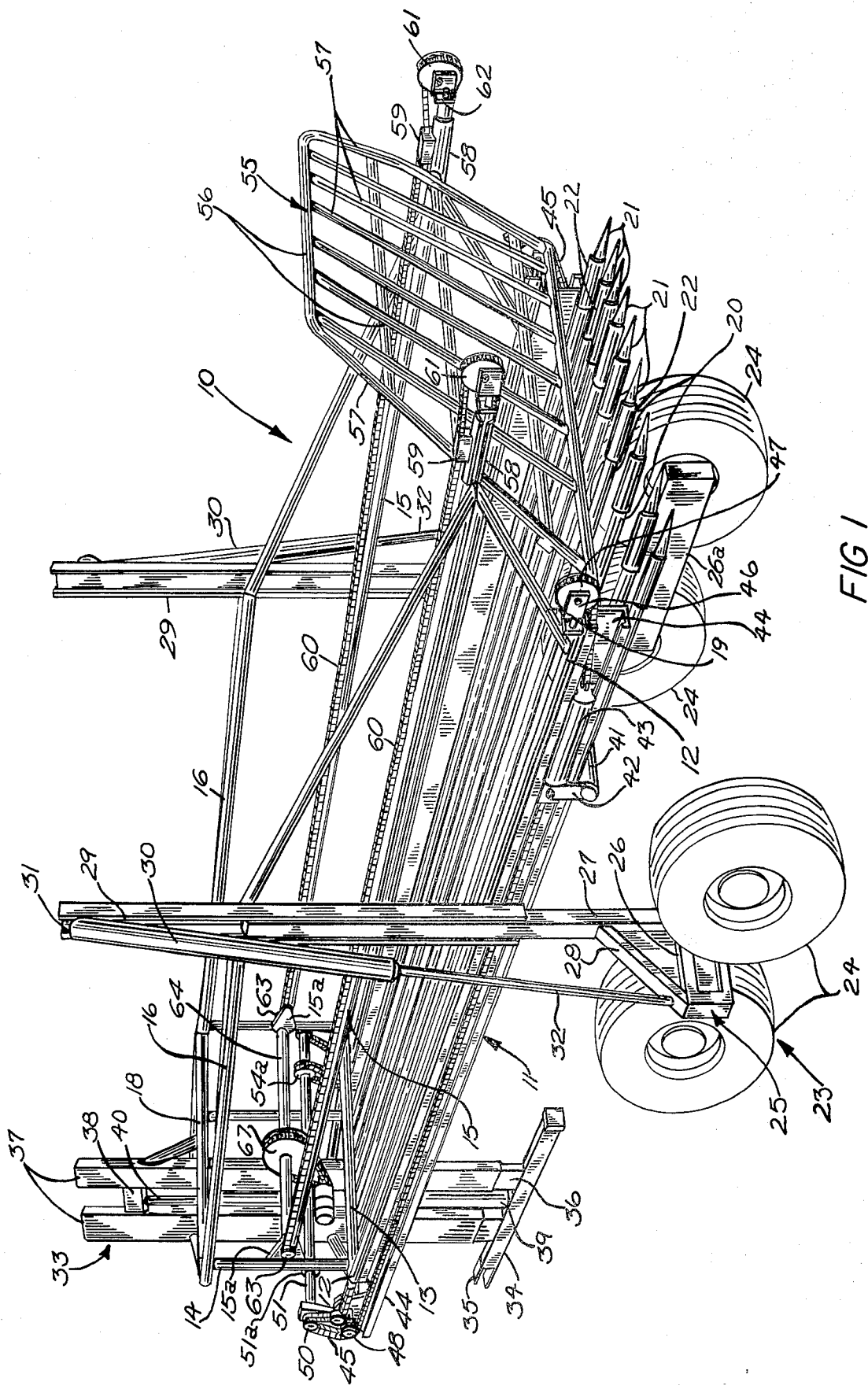
FIG I

PATENTED JUN 17 1975 3,889,832

SHEET 2

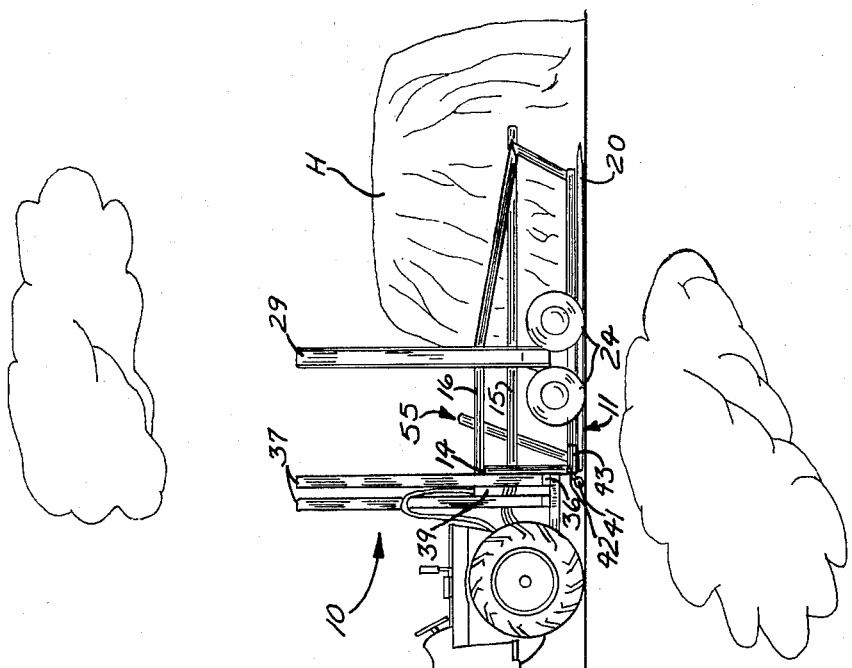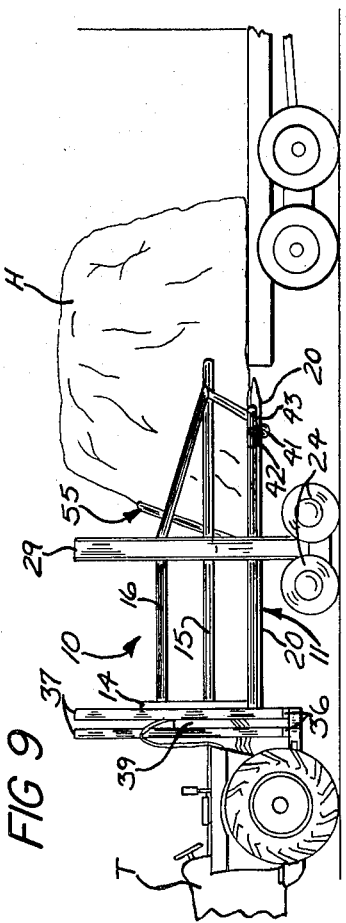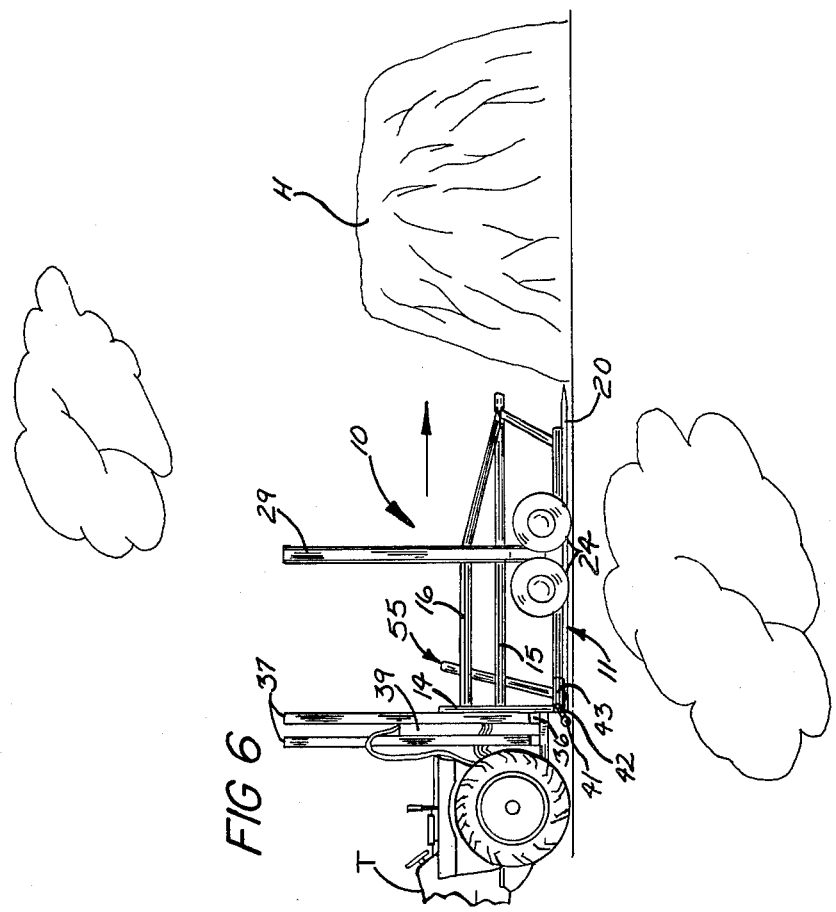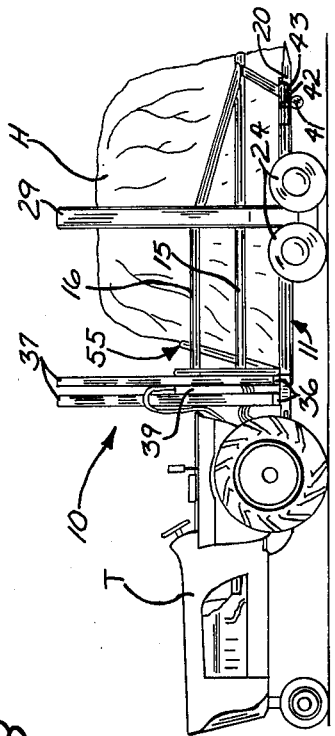

VEHICLE FOR TRANSPORTING HAYSTACKS AND THE LIKE

FIELD OF THE INVENTION

This invention relates to a vehicle for loading and transporting haystacks and the like.

SUMMARY OF THE INVENTION

It is an object of this invention to provide a novel and improved vehicle for loading and transporting haystacks and the like which includes a wheel supported vehicle frame, shiftable between elevated and lowered positions to facilitate loading and unloading of haystacks with respect to the vehicle. More specifically, when the frame of the vehicle is in the lowered position, the vehicle may be moved rearwardly to permit the frame to slide below the stack and thereby permit loading of the stack on the frame.

Another object of this invention is the provision of a vehicle for transporting haystacks and the like which is provided with a pusher structure shiftably mounted on the vehicle frame for shifting movement from a forward position in a rearward direction to progressively push the vehicle rearwardly from the frame.

These and other objects and advantages of this invention will more fully appear from the following description made in connection with the accompanying drawings wherein like reference characters refer to the same or similar parts throughout the several views.

FIGURES OF THE DRAWINGS

FIG. 1 is a rear perspective view of the vehicle for transporting haystacks and the like;

FIGS. 6 through 9 are diagrammatic side elevational views of the vehicle in various positions of use illustrating loading and unloading of haystacks with respect thereto.

DESCRIPTION OF THE PREFERRED EMBODIMENTS OF THE INVENTION

Figure 3:
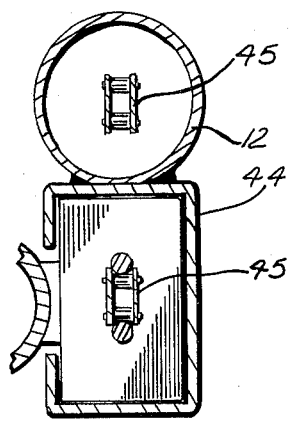
FIG. 3 is a cross-sectional view taken through a portion of the frame and illustrating details of construction thereof.

Referring now to the drawings, and more specifically to FIG. 1, it will be seen that one embodiment of the novel vehicle for loading and transporting haystacks, designated generally by the reference numeral 10 is there shown. The vehicle 10 is comprised of a frame 11 which includes a pair of elongate substantially straight tubular lower frame members 12 which are rigidly affixed at their forward ends to a lower transverse frame member 13. A plurality of substantially straight vertical front frame members 14 are each affixed at its lower end to a lower transverse frame member 13 and project upwardly therefrom. A pair of laterally spaced apart substantially parallel intermediate longitudinal frame members 15 are fixedly connected at their forward ends to plates 15a which are affixed to an intermediate transverse frame member 17. A pair of upper longitudinally frame members 16 are fixedly connected at their forward ends to an upper transverse frame member 18. It will be noted that each of the upper longitudinal frame members 16 is declined downwardly in a rearward direction and each is affixed to the upper end of a pair of laterally spaced apart rear vertical frame members 19, each being fixedly connected at its rear-end to the rear-end of a lower longitudinal frame member 12 and projecting upwardly and rearwardly therefrom.

The frame 11 also includes a bed which is comprised of a plurality of elongate, laterally spaced apart horizontal substantially straight tines 20. The tines 20 are fixedly connected at their forward ends to the lower transverse frame member 13 and project rearwardly therefrom in cantilever fashion. The rear ends of the tines are pointed as at 21 and each has an enlarged portion 22 adjacent but spaced just forwardly of the pointed rear-ends. The tines 20, as well as the enlarged portions 22 are of circular cross-sectional configuration.

The frame 11 is supported for travel over the surface of the ground by a pair of ground engaging wheel assemblies 23, each assembly including a pair of longitudinally spaced apart ground engaging wheels 24 mounted on a wheel frame assembly 25. The wheel frame assembly 25 includes a pair of transverse frame elements 26 which are secured to and project laterally from a longitudinal frame element 26a. The stub axles of each of the ground engaging wheels 24 are journaled in the longitudinal frame element 26a of each wheel frame assembly. Each wheel frame assembly 25 also includes a vertical post 27 which is affixed to and projects upwardly from the longitudinal frame elements 26, as best seen in FIG. 1. A diagonal brace 28 extends between the upper of the transverse frame elements 26 and the associated vertical post 27.

Each of the vertical posts 27 projects telescopically into one of a pair of vertical channels 29, each channel being fixedly secured to the associated upper intermediate and lower longitudinal frame members of the frame 11. Means are provided for vertically shifting the frame 11 relative to the ground engaging wheel assemblies and this means includes a pair of vertically oriented double-acting hydraulic cylinders 30, each being pivotally connected at its upper end by a pivot 31 to one of the vertical channels 29. The piston rod 32 of each hydraulic cylinder is connected to the diagonal brace of the associated wheel frame assembly and it will be seen that extension of the hydraulic piston rod 32 raises the frame relative to the wheel assembly and retraction thereof lowers the frame relative to the ground engaging wheel assemblies.

Referring again to FIG. 1, it will be seen that the vehicle 10 is provided with a hitch assembly 33 at its front end, and the hitch assembly includes an elongate substantially straight hitch or tow bar 34 which has a clevis 35 at its front end. A pair of longitudinally spaced apart inner vertical posts 36 are fixedly connected to the upper surface of the hitch bar 34 and project upwardly therefrom. Each of the inner posts 36 project telescopically into one of the pair of outer vertically disposed outer post 37 which are fixedly connected together and longitudinally spaced apart relation by a spacer bar 38. It will be noted that the rearmost of the outer vertical post 37 is fixedly connected to the upper intermediate and lower transverse frame members of the frame 11. Suitable braces also rigidly interconnect the front outer vertical post 37 to the frame 11. A double-acting hydraulic cylinder 39 is secured to the hitch bar 34 and projects upwardly therefrom. The piston rod 40 of the hydraulic cylinder 39 is connected to the spacer bar 38 whereby extension and retraction of the piston rod 40 vertically shifts the outer vertical posts 37 relative to the inner vertical posts 36 and the hitch bar 34. The hydraulic cylinder 30 and the hydraulic cylinder 39 are both connected by suitable conduits to the hydraulic system for the tractor.

Means are also provided for supporting the rear-end portions of the tines 20 when the vehicle is supporting and transporting a haystack. To this end, an elongate substantially straight support bar 41 is positioned below and extends transversely of the tines 20. Opposite ends of the support bar 41 are secured to vertically extending brackets 42, each of which is secured to one of a pair of slide blocks 43. Each of the slide blocks 43 is positioned and movable within one of a pair of elongate longitudinally extending laterally spaced apart, substantially parallel channels 44. The channels 44 are each secured to one of the lower longitudinal frame members 12 and projects downwardly therefrom.

Means are provided for shifting the support bar 41 in a fore and aft direction, and this means includes a pair of elongate chains 45 each having opposite ends thereof secured to the respective front and rear portions of one of the slide blocks 43. A pair of brackets 46 are each secured to one of the channels 44 adjacent the rear-end thereof and each bracket revolvably supports one of a pair of rear sprockets 47. Each chain 45 is trained over one of the rear sprockets 47 and each chain then passes forwardly through the associated lower longitudinal frame member 12.

Each chain 45 is also trained about lower front idler sprockets 48 and 49. Each chain is also looped upwardly and trained about an upper front sprocket 50 which is keyed to a shaft 51. It will be noted that the shaft 51 extends through the intermediate transverse frame member 58 so that the sprockets 51 are drivingly interconnected to a source of power. The source of power comprises a rotary hydraulic motor 52 which is mounted on a suitable support 52a which in turn is secured to a lower transverse frame element. The output shaft of the motor 52 is provided with a drive sprocket 53 which is drivingly connected to a driven sprocket 54 by a chain 54a. The sprocket 54 is also keyed to the shaft 51 and it will be seen that when motor 52 is energized, the sprocket 54 will be driven. The shaft 51 is journal in bearings 51a which are mounted on posts 14. In this respect, it is pointed out that the motor 52 is reversible and suitable controls will be provided on the tractor for selectively driving the motor 52 in either a forward or rearward direction. It is pointed out that the bar 41 will be moved forwardly during the loading operation, and after the stack is loaded, the bar will then be moved rearwardly to underlie and support the rear-end portions of the tines.

Figure 4:
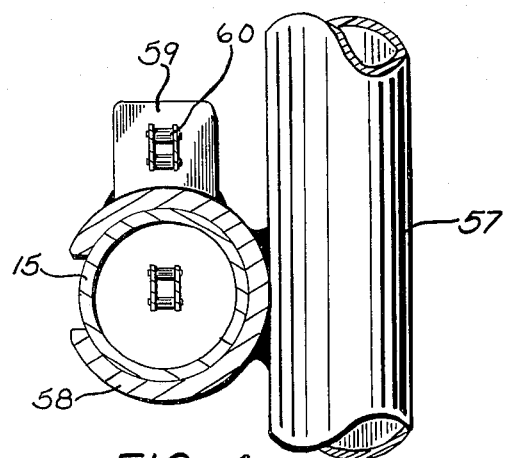
FIG. 4 is a cross-sectional view of another portion of the frame and illustrating details of construction thereof.
Figure 5:
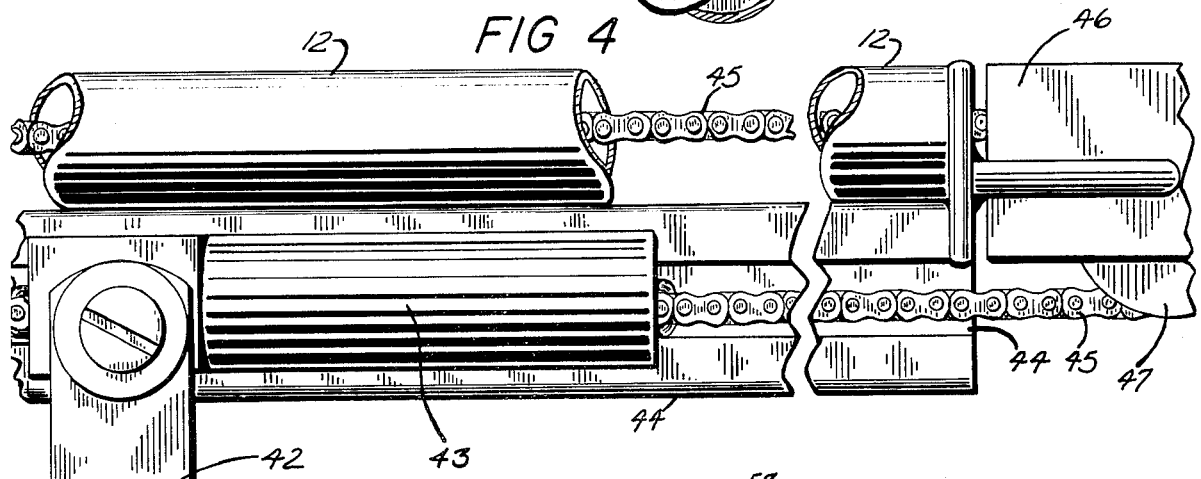
FIG. 5 is a fragmentary side elevational view of a portion of the frame with certain parts thereof broken and foreshortened for clarity and illustrating certain features of the vehicle.
Figure 2:
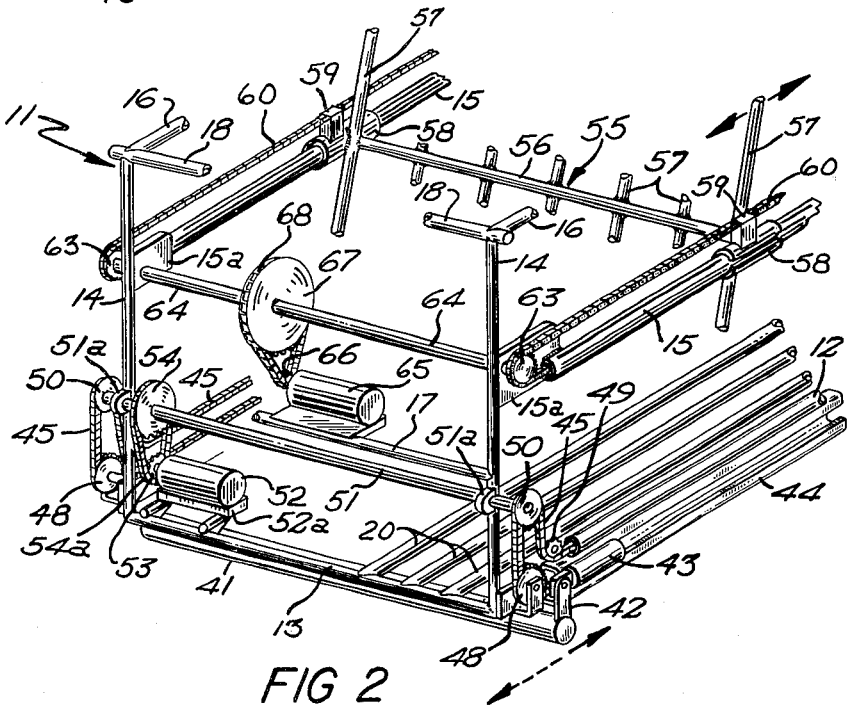
FIG. 2 is a fragmentary diagrammatic front perspective view of the portion of the vehicle.

Means are also provided for unloading a stack supported on the frame 11 and this means includes a pusher member or structure 55 which is shiftably mounted on the frame 11 for fore and aft movement relative thereto. The pusher member 55 is comprised of a plurality of transverse frame elements 56 which are vertically spaced apart and which are rigidly secured together by plurality of laterally spaced apart vertical frame elements 37. The outermost vertical and transverse frame elements actually constitute the peripheral frame for the pusher member 55. In this respect, the outer pair of vertical frame elements 37 of the pusher member 55 are each secured to one of a pair of cylindrical slides 58 as best seen in FIGS. 1 and 4. Each of the cylindrical slides 58 is slidably mounted on one of the intermediate longitudinal frame members 15 and is slidable therealong for shifting the pusher member longitudinally in a fore and aft direction relative to the frame 11.

Each of the cylindrical slides 58 has an attachment block 59 affixed to the upper surface thereof projecting upwardly therefrom. Means for shifting the cylindrical slides 58 relative to the associated intermediate longitudinal frame member comprises a pair of chains 60, each having opposite ends thereof secured to the front and rear surfaces of one of the attachment blocks 59. Each chain 60 is trained about one of a pair of rear idle sprockets 61 which is revolvably mounted on one of the intermediate longitudinal frame members 15 by a bracket 62. The lower run or reach of each chain 60 extends through the associated longitudinal frame member 15 and is trained about one of a pair of sprockets 63 which is keyed to a shaft 64. The shaft 64 is journaled in the plates 15a whereby the sprockets 63 are fixedly connected together. The means for driving the sprocket 63 comprises a reversible rotary hydraulic motor 65 which is mounted by suitable supports to the intermediate transverse frame member 17 and which has a sprocket 66 affixed to the output shaft thereof. A sprocket 66 is drivingly connected to a driven sprocket 67 by a chain 68 and the sprocket 67 is keyed to the shaft 64. It will therefore be seen that when the motor 65 is driven in either a forward or reverse direction, the pusher member 55 will be moved in either a forward or rearward direction relative to the frame 11.

The manner in which the vehicle 10 functions and operates is graphically illustrated in FIGS. 6 through 9. In this respect, it is pointed out that the vehicle 10 will be connected to the conventional hitch connection of a tractor T by means of the hitch assembly 33. The hydraulic motors and hydraulic piston and cylinder units will be connected by suitable hydraulic lines to the hydraulic system of the tractor T, and suitable controls will be provided for the tractor operator. The tines of the frame are maintained in a horizontal level condition regardless of whether the frame is in the lowered position, as illustrated in FIG. 7, or in the elevated position as illustrated in FIGS. 6, 8 and 9.

For example, if it is desirable to load a formed haystack H upon the vehicle 10, the tractor operator will back the vehicle 10 into closely proximal relation with respect to the stack H. The support bar 41 will be moved to a forward position, as shown in FIG. 6 by operating the hydraulic motor 52. The piston rods 32 for the cylinders 30 and the piston rod 40 for the cylinder 39 will be retracted, thus causing vertical translation of the frame 11 in a downward direction. The frame 11 will actually be moved downwardly until it engages the surface of the ground and the vehicle will again be moved rearwardly so that the tines will slide along the lower portion of the formed haystack 11, until the haystack is completely supported on the tines. Thereafter, the piston rods 32 for the cylinders 30 will be extended and the piston rod 40 for the cylinder 39 will also be extended, thereby producing vertical translation of the frame in an upward direction. The frame will be elevated until it reaches the normal transportation as illustrated in FIGS. 6 and 8, and the haystack will then be transported to the desired location.

The operator will energize the motor 52 to move the support bar 42 in a rearward direction until the support bar underlies the rear-end portion of the cantilever supported tines. This movement of the support bar 41 to the rearward position is done before the haystack is transported and the support bar 41 serves to very effectively support the rear-end portions of the tines. The movement of the support bar 41 to the forward position during loading of the stack on the frame is primarily for the purpose of moving the bar to an out-of-the-way position to facilitate loading of the formed haystack on the frames.

During the unloading operation, when the haystack is to be loaded upon the surface of the ground, the frame 11, may be again lowered by extending the piston rods, as in the loading operation. However, in the event that it is desirable to unload the stack upon the bed of the wagon W, the frame 11 may be elevated from the normal transport position, as shown in FIG. 8, to an elevated unloading position as shown in FIG. 9, by further extending the piston rods 32 for the cylinder 30 and extending the piston rod 40 for the cylinder 39.

When the stack is loaded on the vehicle and during transport thereof, the pusher member 55 will be positioned adjacent the forward portion of the frame 11. During the unloading operation, the motor 65 will be energized to drive the cylindrical slides 58 and the pusher member 55 in a rearward direction so that the pusher member progressively urges the haystack rearwardly from the frame 11. It will be noted that the pusher member 11 is inclined rearwardly and upwardly to conform to the forward surface of the formed haystack. This arrangement minimizes any damage to the haystack during the unloading operation. After the haystack has been unloaded, the motor 65 will be reversed and will then move the pusher member to its forward retracted position for the next loading operation.

It is pointed out that during the loading operation, the tines 20 actually penetrate the lower portion of the stack rather than sliding completely beneath the stack. Therefore, during the unloading operation, the lower portion of the stack is pushed from impaled relation with respect to the tines. It has been found that the use of the enlarged portions 22 for the tines 20 facilitate removal of the stack from the frame.

From the foregoing description, it will be seen that my novel stack moving vehicle 10 is operable to permit effective loading of haystacks and transporting of haystacks from one location to another with a minimum of damage to the formed stacks. It will also be noted that my stack moving vehicle permits the stacks to be loaded from the ground, or from elevated surfaces, and permits stacks to be selectively unloaded upon the ground or upon an elevated surface.

Thus it will be seen that I have provided a novel vehicle for loading and transporting formed haystacks, which is not only of simple and inexpensive construction, but one which functions in a more efficient manner than any heretofore known comparable structure.

What is claimed is:

1. A vehicle for transporting formed haystacks and the like, comprising:

a normally horizontally oriented elongate support frame including a bed structure comprised of a plurality of laterally spaced apart elongate tines extending in a fore and aft direction, a hitch on said frame adjacent the front end thereof and being connectable to a prime mover, a pair of ground engaging wheel assemblies positioned on opposite sides of and connected with said frame intermediate the ends thereof for supporting the latter for travel over the surface of the ground, cooperating shiftable pairs of elements on said frame and on each of said ground engaging wheel assemblies to permit vertical translation of said frame relative to said ground engaging wheel assemblies between a lowered position and an elevated position, extensible power means connected between said frame and each of said wheel assemblies for elevating said frame relative to said wheel assemblies, said frame when in the lowered position being positioned closely adjacent the ground and when urged rearwardly sliding below a haystack supported on the ground, said frame being maintained in a substantially horizontal position during its vertical movement, a substantially vertically disposed pusher member shiftably mounted on said frame and being shiftable in a front and rearward direction, longitudinally of said frame from a forward retracted position adjacent the front of said frame to a rearward position adjacent the rear of said frame, said pusher member when shifted from the retracted forward position to the rearward position, progressively unloading a haystack positioned on the frame, power means connected to said pusher member and being mounted on said frame and extending longitudinally thereof, said power means being operable for shifting said pusher member in a forward and rearward direction.

2. The vehicle as defined in claim 1 wherein said tines are of substantially uniform cross-sectional shape that terminate in a pointed rear-end, each tine having an enlarged portion adjacent its rear-end to facilitate unloading of the stack from the frame.

3. A vehicle for transporting formed haystacks and the like, comprising:

a normally horizontally oriented support frame including a bed structure comprised of a plurality of laterally spaced apart elongate tines extending in a fore and aft direction, a hitch on said frame adjacent the front end thereof and being connectable to a prime mover, a ground engaging wheels, means interconnecting said frame with said ground engaging wheels to permit vertical translation of said frame relative to said ground engaging wheels between a lowered position and an elevated position, said frame when in the lowered position being positioned closely adjacent the ground and when urged rearwardly sliding below a haystack supported on the ground, a substantially vertically disposed pusher member shiftably mounted on said frame and being shiftable in a front and rear direction, longitudinally of said frame from a forward retracted position adjacent the front of said frame to a rearward position adjacent the rear of said frame, said pusher member when shifted from the retracted forward position to the rearward position, progressively unloading a haystack positioned on the frame, means on said frame for shifting said pusher member in a forward and rearward direction, a frame member fixedly connected to the forward ends of said tines so that said tines are mounted at their forward ends only to the frame and project rearwardly in cantilever fashion therefrom, and a movable support underlying said tines and shiftably mounted on said frame for shifting movement in a forward and rearward direction between a retracted forward position adjacent the front end of said frame and a rearward position adjacent the rear end of the frame for support of the rear end portions of the tines when a stack is positioned on said frame, and means on said frame for shifting said support between the retracted forward position and the rearward support position.

4. The vehicle as defined in claim 1 wherein said power means includes a pair of chain and sprocket drive means mounted on said frame and extending longitudinally thereof, said chain and sprocket drive means being connected to said pusher member, and a motor connected to said chain and sprocket drive means for operating the same.

5. The vehicle as defined in claim 1 wherein said hitch includes a pair of interengaging vertical disposed members one of said vertically disposed members being connected with said frame and the other of said members have means thereon for connection with a prime mover, said vertically disposed members being shiftable with respect to each other during vertical movement of said frame.

6. The vehicle as defined in claim 3 wherein said means for shifting said movable support comprises a chain and sprocket drive mounted on said frame.

* * * * *